United States Patent

Zhang et al.

[11] Patent Number: 6,007,736
[45] Date of Patent: *Dec. 28, 1999

[54] OXYGEN GENERATING COMPOSITIONS CATALYZED BY COPPER AND NICKEL OXIDES

[75] Inventors: Yunchang Zhang; James C. Cannon, both of Overland Park; Girish S. Kshirsagar, Lenexa, all of Kans.

[73] Assignee: BE Intellectual Property, Wellington, Fla.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/647,818

[22] Filed: May 15, 1996

[51] Int. Cl.⁶ .............................. C01B 11/14; C01B 11/18; A62B 21/00; A62B 7/08

[52] U.S. Cl. ................... 252/187.31; 252/187.1; 422/126

[58] Field of Search ................ 252/187.1, 187.31; 422/126; 149/77, 113

[56] References Cited

U.S. PATENT DOCUMENTS

| | | | |
|---|---|---|---|
| 3,293,187 | 12/1966 | Markowitz | 252/187.31 |
| 3,736,104 | 5/1973 | Churchill et al. | 423/579 |
| 3,862,866 | 1/1975 | Timmerman et al. | 149/21 |
| 3,865,035 | 2/1975 | Munson et al. | 149/38 |
| 3,955,931 | 5/1976 | Thompson | 422/165 |
| 3,996,079 | 12/1976 | DiValentin | 149/35 |
| 4,073,741 | 2/1978 | Heintz | 252/187.31 |
| 4,339,288 | 7/1982 | Camp | 149/8 |
| 4,386,979 | 6/1983 | Jackson, Jr. | 149/21 |
| 4,533,416 | 8/1985 | Poole | 149/35 |
| 4,604,151 | 8/1986 | Knowlton et al. | 149/35 |
| 4,909,549 | 3/1990 | Poole et al. | 280/738 |
| 4,948,439 | 8/1990 | Poole et al. | 149/46 |
| 5,049,306 | 9/1991 | Greer | 252/187.31 |
| 5,198,147 | 3/1993 | Zhang et al. | 252/187.31 |
| 5,279,761 | 1/1994 | Zhang et al. | 252/187.31 |

(List continued on next page.)

FOREIGN PATENT DOCUMENTS 1035248A   9/1989   China .

OTHER PUBLICATIONS

Puritan–Bennett Aero Systems Co.—Chemical Oxygen Generators for Aviation (1972).

European Search Report Re: International Application No. PCT/US97/08561–Dated Sep. 12, 1997.

Industrial & Engineering Chemistry Research—vol. 30, No. 4, 1991 pp. 778–783 XP000486904; Entitled: Oxygen Evolution From $KClO_3$ Catalyzed by Metal Oxides as Air Bag Inflators.

Patent Abstracts of Japan—vol. 016, No. 190 (C–0937) May 8, 1992 & JP 04 026579 A (Daicel Chem Ind Ltd.) Jan. 29, 1992; Entitled: Gas Generating Composition.

*Primary Examiner*—Joseph D. Anthony
*Attorney, Agent, or Firm*—Fulwider Patton Lee & Utecht, LLP

[57] ABSTRACT

The oxygen generation composition utilizes a catalyst selected from the group consisting of copper oxide, nickel oxide, and mixtures thereof, to catalyze the reaction or a chlorate or perchlorate based oxygen generating composition, smooth oxygen generation, improve the rheology of an operating chemical oxygen candle, and to facilitate the mixing of the candle ingredients. The oxygen generation composition typically comprises about a metal powder as a fuel; a catalyst selected from the group consisting of copper oxide, nickel oxide, and mixtures thereof; an additive as a chlorine remover and reaction rate modifier; and an oxygen source selected from the group consisting of alkali metal chlorates, alkali metal perchlorates, and mixtures thereof. The oxygen generating composition can optionally further include a binder.

4 Claims, 1 Drawing Sheet

U.S. PATENT DOCUMENTS

| | | | |
|---|---|---|---|
| 5,298,187 | 3/1994 | Zhang et al. | 252/187.31 |
| 5,338,516 | 8/1994 | Zhang et al. | 422/126 |
| 5,382,050 | 1/1995 | Thompson | 280/741 |
| 5,486,248 | 1/1996 | Taylor et al. | 149/109.6 |
| 5,725,834 | 3/1998 | Nishii et al. | 422/126 |
| 5,783,105 | 7/1998 | Zhang et al. | 252/187.31 |
| 5,882,545 | 3/1999 | Zhang et al. | 252/187.31 |

OXYGEN GENERATING COMPOSITIONS CATALYZED BY COPPER AND NICKEL OXIDES

BACKGROUND OF THE INVENTION

1. Field of the Invention

This invention relates generally to oxygen generating compositions, and more particularly concerns improved oxygen generation compositions containing a catalyst selected from copper oxide, nickel oxide, and a combination thereof.

2. Description of Related Art

Chemical oxygen generating compositions based upon the decomposition of alkali metal chlorates or perchlorates have long been used as an emergency source of breathable oxygen, such as in passenger aircraft, for example. Oxygen generating compositions utilizing alkali metal chlorates or perchlorates are disclosed in U.S. Pat. Nos. 5,198,147; 5,279,761; and 5,298,187; each of which are incorporated herein by reference.

A typical chemical oxygen generating candle may have several layers with different compositions and thus different reaction rates. Multiple layers are used in the candle instead of a single formula to help match the oxygen generation requirements, which vary with time as an airplane descends following a loss of cabin pressure. Different applications have different oxygen generation requirements. The candle typically has a generally cylindrical shape with a taper, with a recess at one end to hold an ignition pellet, which is typically ignited by firing a primer. The heat from the ignition pellet then ignites the reaction of the candle body and generates oxygen.

An aircraft oxygen generator is commonly preprogrammed according to the descent profile of a given type of airplane, and must meet the minimum oxygen flow requirement at all times during a descent. A conventional formulation of the oxygen generating composition generally can include an oxygen source such as a chlorate or perchlorate, a metal powder fuel such as iron powder, and cobalt oxide as a catalyst. Cobalt oxide has a very high catalytic activity in the decomposition of sodium chlorate, so that only a small amount of cobalt oxide (typically as low as 0.1%) is necessary to catalyze the decomposition of sodium chlorate. Such small amounts of the catalyst are difficult to uniformly distribute in a mixture of such an oxygen generating composition, so that an uneven distribution of cobalt oxide can result in variations in reactivity from core to core, and can result in low yields of satisfactory oxygen generating candles or cores. Oxygen generating compositions formulated with cobalt oxide and an inhibitor such as calcium hydroxide can have localized regions having a high cobalt oxide concentration and a low calcium hydroxide concentration occur due to imperfect mixing, with a far higher decomposition rate than other localized regions with a low cobalt oxide and a high calcium hydroxide concentration, leading to erratic and unpredictable performance.

Prolonged mixing is typically used to reduce irregularities in the distribution of the ingredients in cobalt oxide based oxygen generating compositions, increasing the difficulty in manufacturing and increasing manufacturing costs. However, loss of cobalt oxide in the mixer container such as on the mixer walls during preparation of core mixtures can also occur, resulting in performance variations from lot to lot. In addition, cobalt is a strategic metal, and is expensive.

Oxygen generating compositions utilizing manganese oxide as a catalyst for decomposition of chlorate or perchlorate to generate oxygen are known. However, use of manganese oxide as a catalyst produces a high concentration of chlorine in the oxygen gas released. A ferrate catalyzed formulation is also known, which also utilizes barium peroxide to modify the reaction. However, barium peroxide is toxic, and disposal of expended and scrap oxygen generators containing barium peroxide is expensive. It would be desirable to provide an improved oxygen generating formulation in which a uniformity of distribution of ingredients is easier to achieve, which will produce a greater uniformity of performance, and is easier to manufacture than conventional formulations. The present invention meets these needs.

SUMMARY OF THE INVENTION

Briefly, and in general terms, the present invention provides for an improved oxygen generation composition that produces a greater uniformity of performance, a smoother, more uniform rate of oxygen generation, and is easier to mix and manufacture than comparable chlorate/perchlorate oxygen generation compositions utilizing cobalt oxide as a catalyst. A catalyst selected from the group consisting of copper oxide, nickel oxide, and mixtures thereof, is used to catalyze the reaction, smooth oxygen generation, improve the rheology of an operating chemical oxygen candle, and to facilitate the mixing of the candle ingredients.

The invention accordingly provides for an oxygen generating composition for producing a breathable gas upon ignition of the composition, comprising a metal powder as a fuel; a catalyst selected from the group consisting of copper oxide, nickel oxide, and mixtures thereof; an additive as a chlorine remover and reaction rate modifier; and an oxygen source selected from the group consisting of alkali metal chlorates, alkali metal perchlorates, and mixtures thereof. The oxygen generating composition can optionally further include a binder. In one preferred embodiment, the oxygen generating composition can comprise an oxygen generating composition for producing a breathable gas upon ignition of the composition, comprising: about 0.5–15% by weight of a metal powder as a fuel; about 0.1–15% by weight of a catalyst selected from the group consisting of copper oxide, nickel oxide, and combinations thereof; about 0.1–5% by weight of an additive as a chlorine remover and reaction rate modifier; from zero to about 5% by weight of a binder; and the remainder of an oxygen source selected from the group consisting of alkali metal chlorates, alkali metal perchlorates, and mixtures thereof. In another preferred embodiment, the oxygen generating composition can comprise about 1–10% by weight of iron powder as a fuel; about 0.1–15% by weight of a catalyst selected from the group consisting of copper oxide, nickel oxide, and mixtures thereof; about 0.5–4% by weight of an additive as a chlorine remover and reaction rate modifier; about 1–5% by weight of a binder; and the remainder of an oxygen source selected from the group consisting of alkali metal chlorates, alkali metal perchlorates, and mixtures thereof.

Since copper oxide and nickel oxide have a lower catalytic activity than cobalt oxide, a higher loading of them can be used, so that the formulation is easier to mix uniformly, resulting in better and more uniform performance. When copper oxide and nickel oxide are used in place of cobalt oxide, the loading can be 2 to 5 times higher. With a higher loading, it is easier to make adjustments, and it is easier to mix the oxygen generating composition uniformly. Copper oxide and nickel oxide are also less expensive than cobalt oxide, and are readily available.

These and other aspects and advantages of the invention will become apparent from the following detailed description, and the accompanying drawing, which illustrates by way of example the features of the invention.

DETAILED DESCRIPTION OF THE PREFERRED EMBODIMENTS

Figure 1:
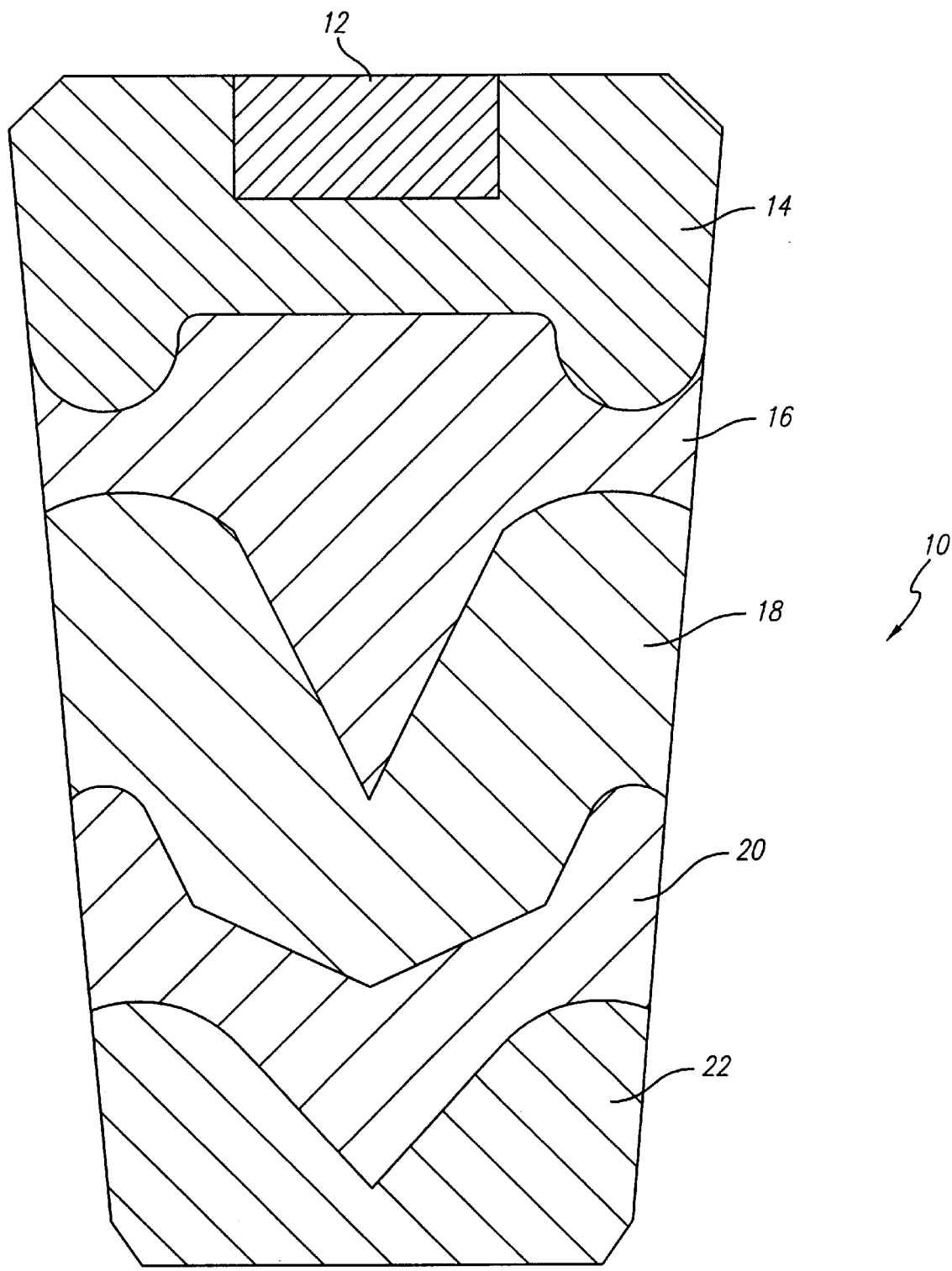
FIG. 1 is a cross sectional view of an oxygen generating candle formed from the oxygen generating composition according to the principles of the invention.

Flow of oxygen from an activated conventional oxygen generation core can often be uneven and erratic. Formulations of oxygen generating compositions using cobalt oxide as a catalyst also typically exhibit a relatively high variation of performance within each lot and among different lots of the same formulation, due to non-uniform distribution of the ingredients within the oxygen generating compositions.

The invention is accordingly embodied in an oxygen generating composition for producing a breathable gas upon ignition of the composition, which generally comprises a chlorate, a metal powder, a catalyst selected from the group consisting of copper oxide, nickel oxide and combinations thereof, and an additive used to modify the reaction, smooth oxygen generation, suppress chlorine formation, and improve the rheology of an operating chemical oxygen candle. The formulation may optionally include a binder.

The oxygen generating composition of the invention generally comprises about 0.5–15% by weight of a metal powder as a fuel. Preferred metal powders include iron, tin, manganese, cobalt, nickel, tungsten, titanium, magnesium, aluminum, niobium, zirconium, and mixtures thereof. In one presently preferred embodiment, iron powder having a high purity and a high surface area is used. Suitable iron powder may be obtained electrolytically or by hydrogen reduction to yield iron powder substantially free of carbon and other impurities which can produce toxic compounds upon operation of the oxygen generating candle. Use of iron powder in the oxygen generating candle furnishes heat and assists in stabilizing the chlorate decomposition.

In a presently preferred embodiment, the oxygen generating composition further comprises about 0.1–15% by weight of a catalyst selected from the group consisting of copper oxide, nickel oxide, and combinations thereof. Copper oxide can be prepared by decomposing copper carbonate at 260° C. Copper oxide prepared in this manner is black, has the formula CuO, and has a surface area of approximately 60 $m^2/g$. Nickel oxide can be prepared by decomposing nickel carbonate hydroxide at 450° C. Nickel oxide prepared in this manner has the formula NiO, and has a surface area of approximately 62 $m^2/g$. Copper oxide and nickel oxide from other sources may also be suitable as long as they have sufficient surface area of at least about 1 $m^2/g$.

In a currently preferred embodiment, the oxygen generating composition further includes from about 0.1 to about 5% by weight of one or more alkaline compounds as a chlorine remover and reaction rate modifier. The alkaline compound can be a hydroxide, oxide, peroxide, superoxide, or carbonate of calcium, magnesium, lithium, or strontium. In one presently preferred embodiment, the alkaline compound can be calcium hydroxide, magnesium oxide (MgO), or lithium peroxide. Other alkaline compounds of lithium, sodium, potassium, rubidium, cesium, magnesium, calcium and strontium can also be employed as additives to smooth out the chlorate/perchlorate decomposition rate, and to suppress production of free chlorine. Examples of other alkaline compounds that may be suitable include, but are not limited to, barium peroxide, lithium aluminate, lithium carbonate, lithium borates, lithium phosphates, lithium silicates, strontium carbonate, strontium phosphate, sodium aluminate, sodium borates and sodium silicates.

The alkaline compounds can suppress the formation of chlorine gas otherwise produced by side reactions during oxygen generation. The alkaline compound can also modify the reaction and smooth the rate of oxygen generation. Without the alkaline compound, the oxygen generation rate becomes more erratic and unpredictable. Preferred alkaline compounds are calcium hydroxide and peroxide, magnesium oxide, hydroxide and peroxide, strontium hydroxide and peroxide, lithium peroxide, and rare earth oxides and peroxides. These materials are preferred because they are reasonably stable in air, are not toxic, can have a high surface area and good physical flow properties, and can help to modify the rheology of the oxygen generating candle. The preferred alkaline compounds should be reasonably stable in air, and in contact with water or moisture, have a small particle size, have good physical properties to facilitate mixing, and should be sufficiently fluffy to assist in modifying the rheology of the oxygen generating candle, and should not be toxic or environmentally hazardous.

Aluminum oxide, titanium oxide and zirconium oxide are not alkaline, but they can have a high surface area or small particle size, and can be used as additives to modify the melt rheology of the oxygen generating candle, and may help to disperse copper oxide and nickel oxide in the oxygen generating composition. Other hydroxides, oxides peroxides and superoxides of alkali metals can also suppress the formation of chlorine and modify the decomposition of sodium chlorate, but are not preferred because they are either caustic, air sensitive or difficult to distribute uniformly. Barium hydroxide and peroxide can also suppress chlorine and modify the decomposition of chlorate, but they are toxic and are thus not preferred.

The oxygen generating compositions of the invention can also optionally further include up to about 5% of one or more binders. In a presently preferred embodiment, the binder can be an inorganic binder such as glass powder, glass fiber, fiberglass, ceramic fiber, steel wool, bentonite, kaolinite and mixtures thereof, for example, although other inorganic binders can also be suitable.

The remainder of the oxygen generating composition preferably comprises an oxygen source selected from the group consisting of alkali metal chlorates, alkali metal perchlorates, and mixtures thereof. The alkali metal chlorate can be sodium chlorate, potassium chlorate, or lithium chlorate, for example, and the alkali metal perchlorate can be potassium perchlorate, lithium perchlorate, or sodium perchlorate, for example, although other alkali metal chlorates and perchlorates may be suitable. The presently preferred chlorate is sodium chlorate, and the presently preferred perchlorate is potassium perchlorate. Sodium chlorate is presently preferred as an oxygen source because it has a relatively high oxygen yield per unit weight compared to potassium chlorate, and a reasonably low decomposition temperature compared to potassium chlorate and perchlorate and lithium perchlorate. Decomposition of sodium chlorate is exothermic once initiated, which permits a self-sustaining operation of an oxygen generating candle or core formed from the oxygen generating compositions of the invention. Sodium chlorate is also currently preferred as the oxygen source due to its currently relatively low price. In one presently preferred aspect of the invention, the oxygen source can alternatively be a combination of a major amount of sodium chlorate and a minor amount of potassium perchlorate.

In one presently preferred embodiment of the invention, the oxygen generating composition can comprise about 1–10% by weight of metal powder as a fuel; about 0.1–15% by weight of a catalyst selected from the group consisting of copper oxide, nickel oxide, and combinations thereof; about 0.5–4% by weight of a chlorine remover and reaction rate modifier; from zero to about 5% of a binder; and the remainder of an oxygen source selected from the group consisting of alkali metal chlorates, alkali metal perchlorates, and mixtures thereof.

In forming an oxygen generating core or candle, the metal powder, catalyst, chlorine remover and reaction rate modifier additive, and the binder (if used) are premixed. The oxygen source chlorate/perchlorate component is typically separately mixed with approximately 1 to 5% water, by weight, which is used as a lubricant to facilitate the formation of the oxygen generating cores or candles. The premixed powder is then mixed with the wet chlorate/perchlorate. The chemical oxygen candles are formed by compaction of the damp mixture in a mold, and are then dried at about 120° C. to remove the water that was added during the mixing process. However, a small residue of water may remain in the oxygen generating composition even after drying.

With reference to FIG. 1, a typical chemical oxygen generating candle 10 commonly is composed of several layers, with each layer having a different formulation. The multiple layers with different formulations can thus be designed to match the desired oxygen generation rate, based upon specified requirements of the application, since different applications may have different oxygen generation rate requirements. While the oxygen generating candle shown in FIG. 1 has 5 layers, any number of layers can be used to form the oxygen generating candle. Iron powder is currently preferably used as a fuel in one or more of the layers, depending upon the application. The various types of interface shapes between layers, shown in FIG. 1, are used to help control the transition of the reaction as it progresses from one layer to another. The interface shapes and relative sizes and reactivities of the layers can be modified, depending upon the requirements of the specific applications of the oxygen generating candles. Oxygen generation candles or cores are typically formed in a cylindrical shape with a taper. At the top of the candle there is a recess to hold an ignition pellet 12, which can be ignited by firing a percussion primer, for example. A typical ignition pellet can, for example, have a composition of about 35% by weight iron, 13–15% by weight cobalt oxide, about 5% iron oxide, about 3–4% by weight of a binder, and the balance sodium chlorate. The heat from the ignition pellet is then sufficient to initiate the decomposition of the layers 14, 16, 18, 20 and 22 of the oxygen generating candle to release oxygen.

The oxygen generating compositions of the invention are further illustrated in the following examples, in which percentages are by weight.

EXAMPLE 1

1st layer: 15 grams: 12% iron powder, 0.55% $Mg(OH)_2$, 9.5% cobalt oxide, 4% glass powder, and 73.95% $NaClO_3$.
2nd layer: 30 grams: 6.5% iron powder, 0.7% $Mg(OH)_2$, 3.6% CuO, 2% glass powder, and 87.2% $NaClO_3$.
3rd layer: 110 grams: 5.4% iron powder, 1% $Mg(OH)_2$, 1.15% CuO, 2% glass powder, and 90.45% $NaClO_3$.
4th layer: 115 grams: 1.75% iron powder, 1% $Mg(OH)_2$, 0.55% CuO, 2% glass powder, and 94.70% $NaClO_3$.
5th layer: 100 grams: 1.0% iron powder, 0.7% $Mg(OH)_2$, 0.18% cobalt oxide, 0.5% CuO, 3.5% glass powder, and 94.12% $NaClO_3$.

The powders for each layer were premixed without sodium chlorate, and then the premixed powders were mixed with sodium chlorate. A small amount of distilled water was used to wet each mixture. Chemical oxygen candles were then formed by compaction of the damp mixtures in a mold. The candles were then dried at 120° C. to remove the water added.

A dried candle was then loaded into a stainless steel housing, ignited, and operated for 15.8 minutes, generating approximately 111.5 liters of oxygen at room temperature. The reaction was uniform, and the expended candle had a uniform texture.

EXAMPLE 2

1st layer: 17 grams: 12.5% iron powder, 9.5% cobalt oxide, 4% glass powder, and 74% $NaClO_3$.
2nd layer: 48 grams: 6.7% iron powder, 1.5% cobalt oxide, 1% magnesium oxide, 2% glass powder, and 88.8% $NaClO_3$.
3rd layer: 100 grams: 5.5% iron powder, 0.53% cobalt oxide, 1% magnesium oxide, 2% glass powder, and 90.97% $NaClO_3$.
4th layer: 85 grams: 3.4% iron powder, 0.8% copper oxide, 1% magnesium oxide, 2% glass powder, and 92.8% $NaClO_3$.
5th layer: 70 grams: 2.5% iron powder, 0.4% copper oxide, 1% magnesium oxide, 2.5% glass powder, and 93.6% $NaClO_3$.
6th layer: 50 grams: 1.5% iron powder, 0.5% copper oxide, 1% magnesium oxide, 3% glass powder, and 94% $NaClO_3$.

An oxygen candle was formed with these six layers, and when operation of the candle was initiated, the candle operated smoothly for 15.8 minutes, generating 110.5 liters of oxygen at room temperature.

EXAMPLE 3

1st layer: 25 grams: 13% iron powder, 9.5% cobalt oxide, 3% glass powder, and 74.5% $NaClO_3$.
2nd layer: 55 grams: 8% iron powder, 0.5% $Ca(OH)_2$, 1.9% $Co_3O_4$, 2.5% glass powder, and 87.1% $NaClO_3$.
3rd layer: 100 grams: 6.5% iron powder, 0.5% $Ca(OH)_2$, 2.2% CuO, 2% glass powder, and 88.8% $NaClO_3$.
4th layer: 130 grams: 3.25% iron powder, 0.5% $Ca(OH)_2$, 1% CuO, 2.5% glass powder, and 92.75% $NaClO_3$.
5th layer: 105 grams: 1.2% iron powder, 0.5% $Ca(OH)_2$, 0.8% CuO, 2.5% glass powder, and 95% $NaClO_3$.

An oxygen candle with these five layers operated smoothly for 21.1 minutes, generating 120.8 liters of oxygen at room temperature.

It will be apparent from the foregoing that while particular forms of the invention have been illustrated and described, various modifications can be made without departing from the spirit and scope of the invention. For instance, although water was utilized in forming the compositions in the examples above, it would be possible to suitably compress dry mixtures to form chemical cores. Furthermore, although the cores as illustrated are typically cylindrical with a taper, molds could be constructed in many other configurations. Accordingly, it is not intended that the invention be limited, except as by the appended claims.

What is claimed is:

1. An oxygen generating candle for producing a breathable oxygen gas for emergency use for sustaining life for several minutes upon ignition of the candle, the candle comprising:

an ignition pellet having a composition consisting essentially of 35% by weight iron, 13–15% by weight cobalt oxide, about 5% iron oxide, about 3–4% by weight of a binder, and the balance sodium chlorate; and an oxygen generating composition disposed adjacent to said ignition pellet, said oxygen generating composition consisting essentially of:
  a metal powder as a fuel;
  a catalyst selected from the group consisting of copper oxide, nickel oxide, and combinations thereof;
  an additive as a chlorine remover and reaction rate modifier, said additive being selected from an alkaline compound selected from the group consisting of calcium hydroxide, calcium peroxide, magnesium hydroxide, magnesium peroxide, strontium hydroxide, strontium peroxide, lithium peroxide, rare earth oxides, rare earth peroxides, and combinations thereof, and a non-alkaline compound selected from the group consisting of aluminum oxide, titanium oxide, zirconium oxide, and combinations thereof; and
  the remainder of an oxygen source selected from the group consisting of alkali metal chlorates, alkali metal perchlorates, and mixtures thereof, said composition being capable of producing said breathable oxygen gas for a period of several minutes for sustaining life.

2. An oxygen generating candle for producing a breathable oxygen gas for emergency use for sustaining life for several minutes upon ignition of the candle, the candle comprising:

an ignition pellet having a composition consisting essentially of 35% by weight iron, 13–15% by weight cobalt oxide, about 5% iron oxide, about 3–4% by weight of a binder, and the balance sodium chlorate; and an oxygen generating composition disposed adjacent to said ignition pellet, said oxygen generating composition consisting essentially of:
  a metal powder as a fuel;
  a catalyst selected from the group consisting of copper oxide, nickel oxide, and combinations thereof;
  an additive as a chlorine remover and reaction rate modifier, said additive being selected from an alkaline compound selected from the group consisting of calcium hydroxide, calcium peroxide, magnesium hydroxide, magnesium peroxide, strontium hydroxide, strontium peroxide, lithium peroxide, rare earth oxides, rare earth peroxides, and combinations thereof, and a non-alkaline compound selected from the group consisting of aluminum oxide, titanium oxide, zirconium oxide, and combinations thereof;
  a binder; and
  the remainder of an oxygen source selected from the group consisting of alkali metal chlorates, alkali metal perchlorates, and mixtures thereof, said composition being capable of producing said breathable oxygen gas for a period of several minutes for sustaining life.

3. An oxygen generating candle for producing a breathable oxygen gas for emergency use for sustaining life for several minutes upon ignition of the candle, the candle comprising:

an ignition pellet having a composition consisting essentially of 35% by weight iron, 13–15% by weight cobalt oxide, about 5% iron oxide, about 3–4% by weight of a binder, and the balance sodium chlorate; and an oxygen generating composition disposed adjacent to said ignition pellet, said oxygen generating composition consisting essentially of:
  about 0.5–15% by weight of metal powder as a fuel;
  about 0.1–15% by weight of a catalyst selected from the group consisting of copper oxide, nickel oxide, and combinations thereof;
  about 0.1–5% by weight of an additive as a chlorine remover and reaction rate modifier, said additive being selected from an alkaline compound selected from the group consisting of calcium hydroxide, calcium peroxide, magnesium hydroxide, magnesium peroxide, strontium hydroxide, strontium peroxide, lithium peroxide, rare earth oxides, rare earth peroxides, and combinations thereof, and a non-alkaline compound selected from the group consisting of aluminum oxide, titanium oxide, zirconium oxide, and combinations thereof;
  from zero to about 5% by weight of a binder; and
  the remainder of an oxygen source selected from the group consisting of alkali metal chlorates, alkali metal perchlorates, and mixtures thereof, said composition being capable of producing said breathable oxygen gas for a period of several minutes for sustaining life.

4. An oxygen generating candle for producing a breathable oxygen gas for emergency use for sustaining life for several minutes upon ignition of the candle, the candle comprising:

an ignition pellet having a composition consisting essentially of 35% by weight iron, 13–15% by weight cobalt oxide, about 5% iron oxide, about 3–4% by weight of a binder, and the balance sodium chlorate; and an oxygen generating composition disposed adjacent to said ignition pellet, said oxygen generating composition consisting essentially of:
  about 1–10% by weight of metal powder as a fuel;
  about 0.1–15% by weight of a catalyst selected from the group consisting of copper oxide, nickel oxide, and combinations thereof;
  about 0.5–4% by weight of an additive as a chlorine remover and reaction rate modifier, said additive being selected from an alkaline compound selected from the group consisting of calcium hydroxide, calcium peroxide, magnesium hydroxide, magnesium peroxide, strontium hydroxide, strontium peroxide, lithium peroxide, rare earth oxides, rare earth peroxides, and combinations thereof, and a non-alkaline compound selected from the group consisting of aluminum oxide, titanium oxide, zirconium oxide, and combinations thereof;
  from zero to about 5% by weight of a binder; and
  the remainder of an oxygen source selected from the group consisting of alkali metal chlorates, alkali metal perchlorates, and mixtures thereof, said composition being capable of producing said breathable oxygen gas for a period of several minutes for sustaining life aboard aircraft.

* * * * *